Patented Jan. 25, 1938

2,106,697

UNITED STATES PATENT OFFICE 2,106,697

PROCESS FOR THE MANUFACTURE OF ACETAMIDE

Wendell P. Munro, Bound Brook, Elmore H. Northey and Hans Z. Lecher, Plainfield, N. J., assignors to The Calco Chemical Company, Inc., Bound Brook, N. J., a corporation of Delaware No Drawing. Application April 13, 1936, Serial No. 74,194

5 Claims. (Cl. 260—124)

The present invention relates to a method of producing acetamide, and more particularly to a new process of producing acetamide at high purity.

Most of the known processes for producing acetamide present serious operating difficulties if a pure product is desired, and especially where the product must be anhydrous. Thus the usual method of distilling ammonium acetate requires a slow and long distillation. It has also been proposed to bring about reaction between ethyl acetate and ammonia but this process also produces an acetamide which is not pure and which notably contains water due to the great hygroscopicity of the acetamide.

According to the present invention, acetamide is produced by reacting aqueous ammonia on ethyl or particularly methyl acetate which reacts much more rapidly and completely, and the purification is effected after distilling off the water and alcohol formed by washing the acetamide with anhydrous methyl acetate or in the case where ethyl acetate is used as a raw material, with anhydrous ethyl acetate. Methyl acetate and similarly ethyl acetate, have not a high solvent action on acetamide at ordinary temperatures, but tend to dissolve water and thus dry out the acetamide. The acetamide obtained may be further washed with an inert organic liquid like benzene which has but little solvent action on acetamide and which protects the surface of the purified product from absorption of water. As the reaction of the ester with ammonia takes place in aqueous medium, the wet ester resulting from washing the acetamide may be used instead of pure anhydrous ester and the washing step results therefore in no material loss of raw material and acetamide. When a small amount of an inert organic liquid like benzene is used for final washing and coating, the benzene may remain with the ester to be used for the next batch; it will be later distilled off together with water, unreacted ammonia and ester, and the alcohol formed.

In order to obtain a pure product in a good yield, the reaction should be carried out below 80° C., because at higher temperature the formation of ammonium acetate becomes a disturbing factor. The reaction proceeds with sufficient speed and completeness at ordinary temperatures and neither heating nor cooling are therefore necessary which reduces the cost of apparatus.

The invention will be described in greater detail in connection with the following specific example which is illustrative only and is not intended to limit the invention to specific conditions and proportions given:

Example 94 parts of methyl acetate are agitated with 180 parts of 28% aqueous ammonia solution until the methyl acetate is all dissolved. The solution is then allowed to stand for a total time of 20 hours at room temperature. Reacting then being complete, the methyl alcohol, water and excess ammonia, and traces of unreacted methyl acetate are distilled off through a fractionating column. The residue is ground with 47 parts of methyl acetate, the methyl acetate liquor filtered off, the crystals washed once with 47 parts methyl acetate, and twice with 13 parts of benzene, and finally dried in vacuo at 60–70° C. The combined wash liquors are used without further treatment to make another batch of acetamide. The yield of acetamide is good, and the product is obtained as colorless, practically odorless crystals of high quality.

Ethyl acetate may be used in a similar manner but the reaction is not as rapid or as complete as with methyl acetate and the methyl acetate therefore constitutes a preferred embodiment of the invention, particularly as the solvent power of methyl acetate for water is greater than that of ethyl acetate and it is therefore a more efficient washing medium than ethyl acetate so that improved results are also obtained in the second step of the process. It will be apparent that the present invention eliminates costly equipment for a troublesome fractional distillation or for distillation of the acetamide itself and the reaction is not carried out at high temperatures or under high pressures which further eliminates the necessity for expensive apparatus. The expense and loss incident to recrystallization which may be necessary in processes used hitherto, is also avoided without any loss in purity of the acetamide.

What we claim is:

1. A process of producing acetamide which comprises reacting aqueous ammonia with an acetic acid ester of a lower monohydric paraffin alcohol having good solvent power for water, distilling off alcohol formed, unchanged ammonia and unreacted ester and water, washing the product with fresh ester followed by washing with a small amount of an inert organic liquid having low solvent action upon water and using the washing liquor as raw material for the next batch.

2. A process according to claim 1 in which the temperature of reaction is below 80° C.

3. A process of producing acetamide which comprises reacting aqueous ammonia on methyl acetate, distilling off excess ammonia and unreacted methyl acetate and the methyl alcohol formed and water, washing the product with methyl acetate followed by a small amount of an inert organic liquid having low solvent action upon water and using the wash liquor as raw material for the next batch.

4. A method according to claim 3 in which the temperature is below 80° C.

5. A method according to claim 3 in which the inert organic liquid is benzene.

WENDELL P. MUNRO.
ELMORE H. NORTHEY.
HANS Z. LECHER.